E. G. OWEN.
FRICTION DRIVING MECHANISM FOR MOTOR VEHICLES.
APPLICATION FILED APR. 29, 1911.

1,005,291.

Patented Oct. 10, 1911.

2 SHEETS—SHEET 1.

Witnesses
O. Larson

Inventor
Edwin G. Owen
By
Attorneys

E. G. OWEN.
FRICTION DRIVING MECHANISM FOR MOTOR VEHICLES.
APPLICATION FILED APR. 29, 1911.

1,005,291.

Patented Oct. 10, 1911.

2 SHEETS—SHEET 2.

Witnesses
E. Larson

Inventor
Edwin G. Owen
By
Attorneys

UNITED STATES PATENT OFFICE.

EDWIN G. OWEN, OF WYSOX, PENNSYLVANIA.

FRICTION DRIVING MECHANISM FOR MOTOR-VEHICLES.

1,005,291.   Specification of Letters Patent.   Patented Oct. 10, 1911.

Application filed April 29, 1911. Serial No. 624,074.

*To all whom it may concern:*

Be it known that I, EDWIN G. OWEN, a citizen of the United States, residing at Wysox, in the county of Bradford and State of Pennsylvania, have invented certain new and useful Improvements in Friction Driving Mechanism for Motor-Vehicles, of which the following is a specification.

This invention relates to the drive gear of motor vehicles, and has for its object to provide an improved friction driving mechanism, the motion of the engine shaft being transmitted by means of friction rollers which are in contact with the peripheries of the drive wheels of the vehicle.

The invention also has for its object to provide means for controlling the friction rollers so that turns may be readily made, and, furthermore, to so support the rollers that they stay in operative position when the wheels are jarred upon passing over rough roads.

In order that the invention may be better understood, reference is had to the accompanying drawings forming a part of this specification, in which drawings—

Figure 1:
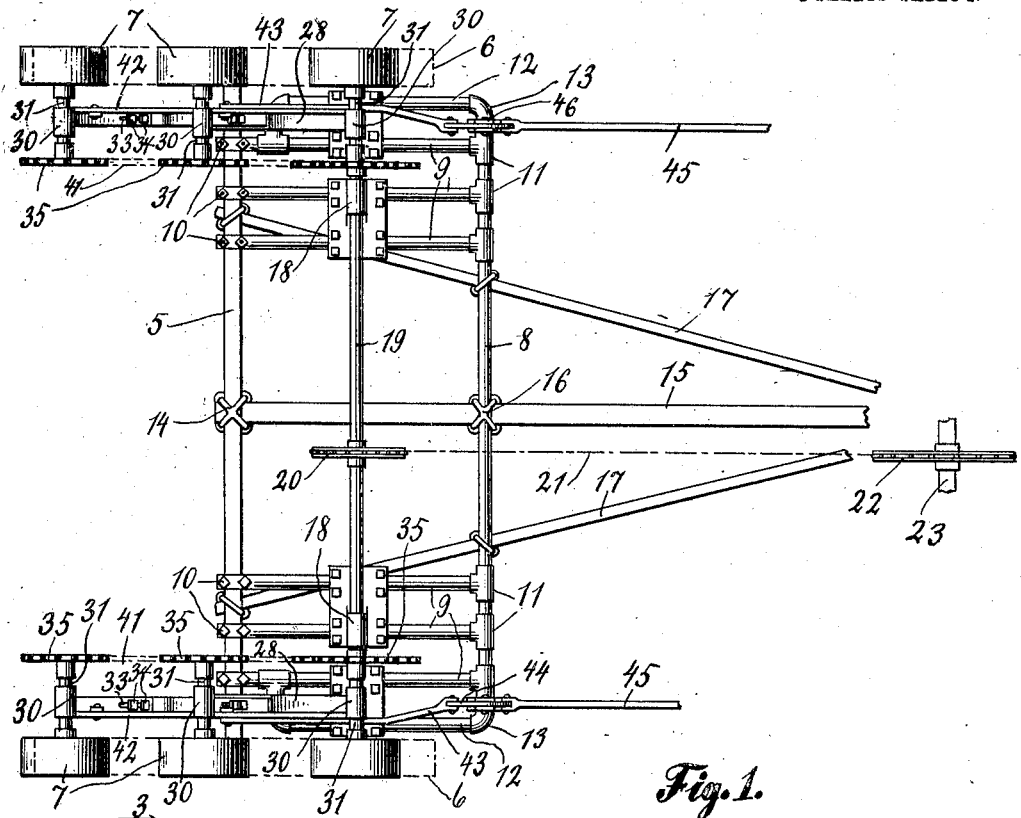
Figure 2:
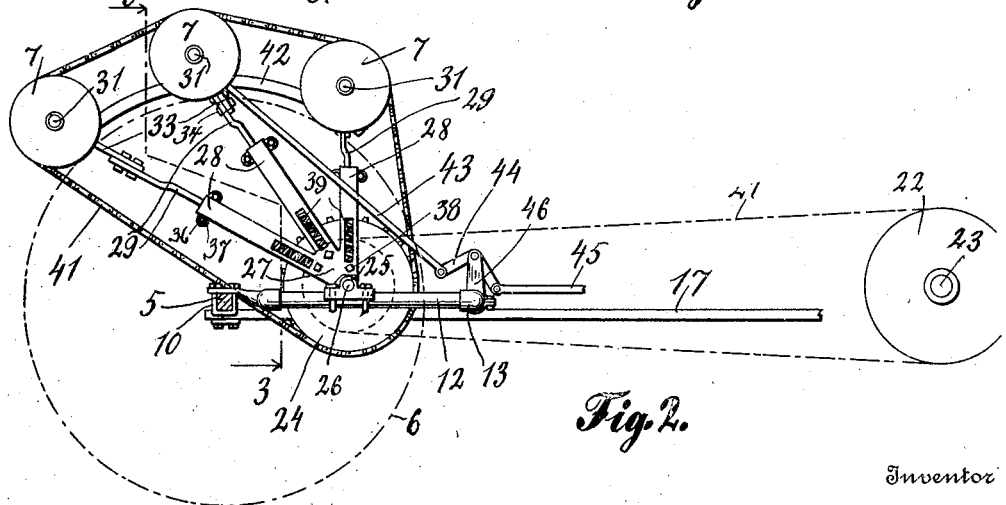
Figure 3:
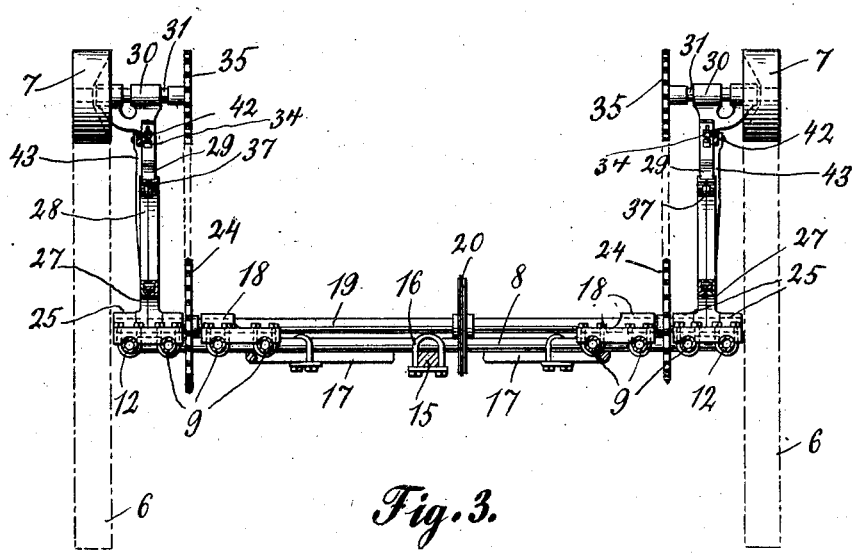
Figure 4:
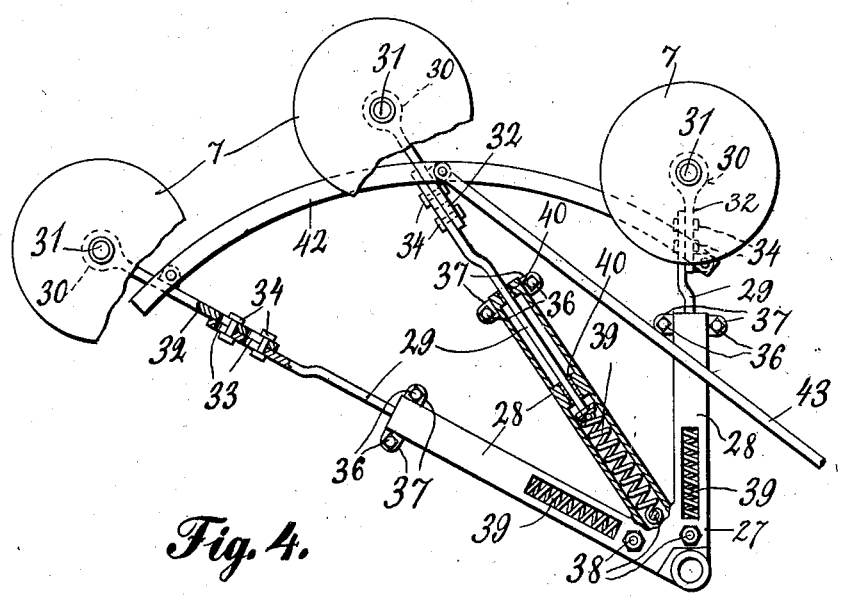

Figure 1 is a plan view of the gearing. Fig. 2 is a side elevation. Fig. 3 is a transverse section on the line 3—3 of Fig. 2. Fig. 4 is an enlarged elevation of the roller supports, partly in section.

Referring specifically to the drawings, 5 denotes one of the axles of a motor vehicle, and the wheels of said vehicle are indicated at 6, they being shown in dotted lines. The axle 5 carries the supporting frame of friction rollers 7. As shown in the drawings, three friction rollers are provided for each wheel.

The supporting frame of the friction rollers comprises a transverse tubular bar 8 located in front of and extending parallel to the axle 5, and arms 9, said arms connecting the bar to the axle and being secured to the latter by clips or other suitable fastening means 10. The connection between the arms and the bar is made by means of T-couplings 11. The frame also includes arms 12 which are secured to the ends of the bar 8 by elbows 13, said arms extending rearwardly and being connected at their rear ends by elbows and T-couplings, as shown in Fig. 1, to adjacent ones of the arms 9. To the axle 5 is also secured, by means of clips 14, a longitudinal bar 15 which extends forwardly from said axle and is connected at its front end to the engine support or any other suitable portion of the vehicle frame (not shown). The bar 8 is also connected to this longitudinal bar by means of clips 16. The frame herein described is also provided with torsion rods 17 which are clipped to the axle and the bar 8.

The arms 9 carry bearings 18 in which is journaled a shaft 19 extending parallel to the axle 5, and on which shaft is made fast a sprocket wheel 20 which is connected by means of a chain 21 to a sprocket wheel 22 on a shaft 23 driven by the engine (not shown). On the ends of the shaft 19 are also made fast sprocket wheels 24.

Each arm 12, and the arm 9 adjacent thereto, also carries a bearing 25 in which is supported a short shaft 26 which serves as the pivot of a vertically swinging rocker 27. The shaft 26 is in axial alinement with the shaft 19. The rocker has three tubular arms 28 extending radially, and receiving the inner end of a rod 29, to the outer end of which rod is secured a bearing 30 carrying the shaft 31 of one of the friction rollers 7. The bearing 30 has an arm 32 whereby it is connected to the arm 29, said parts being slotted as shown at 33, through which slots pass bolts 34. The slots provide an adjustable connection between the rod 29 and the arm 32. On the shaft 31 is also made fast a sprocket wheel 35. The arms 28 are cast in two pieces which are fastened together by means of bolts 36 passing through ears 37 on the two parts of the arms at their outer ends. Bolts 38 also pass through the parts near their inner ends.

As already described, the rods 29 extend at their inner ends into the arms 28, and within each of said arms is located a coiled spring 39 one end of which is connected to the bolt 38, and the other end to the inner end of the rod 29. The bore of the arm also has bearing portions 40 through which the rod passes with a sliding fit. The purpose of the springs 39 is to hold the rollers 7 in yielding contact with the periphery of the wheels 6, a support as herein described being provided for each roller.

The friction rollers of the respective wheels are driven by a chain 41 passing over the sprocket wheels 35 on the shafts of said rollers, and also over the sprocket wheels 24 on the drive shaft 19, the several sprocket wheels being located in the same vertical plane.

The arms 32 of each set of rollers are connected by an arcuate bar 42 to which is connected one end of a rod 43, the other end of which is connected to one of the branches of a bell-crank lever 44, to the other branch of which is connected an operating rod 45. The bell-crank lever is supported by a bracket 46 carried by the bar 8. The friction rollers are swung into and out of engagement with the wheels 6 upon operating the rod 45, said rod, through the connections herein described, swinging the supporting arms of the rollers in a vertical plane and thus carrying the rollers toward and from the periphery of the wheels.

In operation, assuming the friction rollers 7 to be in engagement with the periphery of the wheels 6, the motion of the shaft 23 is transmitted by the sprocket and chain gearing shown to the shaft 19, and the sprocket wheels 24, chain 41, and sprocket wheels 35 transmit the motion to the rollers, and as said rollers are in contact with the peripheries of the wheels 6, the latter are driven. If a turn is to be made, one set of rollers will be disengaged from the corresponding wheel, it being understood that each wheel runs freely on the axle 5. The springs 39 secure a constant steady pressure of the rollers on the peripheries of the wheels, and also permit said rollers to yield in order to follow the wheels as they are jarred up and down upon passing over rough roads.

The preferred embodiment of the invention has been shown, but it is to be understood that various changes in the structural details may be resorted to without a departure from the spirit and scope of the invention.

The mechanism herein described is to be used in connection with the spring wheel disclosed in my application for patent Serial No. 615,888, filed March 21, 1911, and it is intended, primarily, for motor vehicles, the driving wheels of which run freely on a fixed axle. The mechanism saves power as the latter is applied directly to the periphery or tire of the wheel. There is also a great saving of power in turning angles and curves, besides saving the tires and roads at such points, by the lifting device to clear the rollers from the wheels, thereby preventing the sliding of the wheel which occurs when traction axles are employed.

I claim:

1. A friction driving mechanism comprising a drive wheel, a rocker having tubular arms, rods extending at one of their ends into said arms, springs secured to the inner ends of the arms, friction rollers carried by the outer ends of the arms and adapted to engage the periphery of the drive wheel, a drive shaft, and a gearing between the drive shaft and the rollers.

2. A friction driving mechanism comprising a drive wheel, a vertically swinging rocker, shafts carried by said rocker, sprocket wheels and rollers mounted on the shafts, the rollers being in engagement with the drive wheel, a drive shaft in axial alinement with the pivotal axis of the rocker, a sprocket wheel on the drive shaft, and a chain connecting said sprocket wheel with the first-mentioned sprocket wheels.

3. A friction driving mechanism comprising a drive wheel, a vertically swinging rocker, rollers carried by the rocker and adapted to engage the drive wheel, a drive shaft, a gearing between the drive shaft and the rollers, and means for operating the rocker to engage and disengage the friction rollers.

4. A friction driving mechanism comprising a drive wheel, a vertically swinging rocker, arms extending therefrom, rollers yieldingly supported by said arms and adapted to engage the periphery of the drive wheel, a drive shaft, and a gearing between said drive shaft and the rollers.

5. The combination with the drive wheels of a motor vehicle, and the axle of said wheels, of a frame mounted on said axle, bearings carried by said frame, a drive shaft supported in said bearings, vertically swinging rockers mounted on the frame, the pivotal axes of said rockers being in alinement with the drive shaft, arms extending from the rockers, rollers carried by said arms and adapted to engage the drive wheels, and a gearing between the drive shaft and the rollers.

In testimony whereof I affix my signature in presence of two witnesses.

EDWIN G. OWEN.

Witnesses:
 SUSAN A. OWEN,
 LOTTIE WEAVER.